US009121936B2

(12) United States Patent
Tominaga

(10) Patent No.: US 9,121,936 B2
(45) Date of Patent: Sep. 1, 2015

(54) POSITIONING METHOD, GNSS RECEIVING APPARATUS, AND MOBILE TERMINAL

(75) Inventor: Takaki Tominaga, Nishinomiya (JP)

(73) Assignee: FURUNO ELECTRIC COMPANY LIMITED, Hyogo (JP)

( * ) Notice: Subject to any disclaimer, the term of this patent is extended or adjusted under 35 U.S.C. 154(b) by 329 days.

(21) Appl. No.: 13/581,257

(22) PCT Filed: Feb. 23, 2011

(86) PCT No.: PCT/JP2011/054024
§ 371 (c)(1),
(2), (4) Date: Aug. 24, 2012

(87) PCT Pub. No.: WO2011/105446
PCT Pub. Date: Sep. 1, 2011

(65) Prior Publication Data
US 2012/0319894 A1 Dec. 20, 2012

(30) Foreign Application Priority Data

Feb. 26, 2010 (JP) ................................ 2010-042854

(51) Int. Cl.
G01S 19/22 (2010.01)
G01S 19/37 (2010.01)
(Continued)

(52) U.S. Cl.
CPC ............... *G01S 19/22* (2013.01); *G01S 19/37* (2013.01); *G01S 19/40* (2013.01); *G01S 19/42* (2013.01); *G01S 19/428* (2013.01)

(58) Field of Classification Search
CPC ......... G01S 19/22; G01S 19/37; G01S 19/40; G01S 19/42; G01S 19/428

USPC ............. 342/357.61, 357.63, 357.75, 357.77, 342/373
See application file for complete search history.

(56) References Cited

U.S. PATENT DOCUMENTS 6,445,692 B1 * 9/2002 Tsatsanis ...................... 370/342
8,471,764 B2 * 6/2013 Krach et al. ............. 342/357.61
(Continued)

FOREIGN PATENT DOCUMENTS

JP     8-68849 A     3/1996
JP     2000-55679 A  2/2000
(Continued)

OTHER PUBLICATIONS

Welch et al., "An Introduction to the Kalman Filter", Department of Computer Science, University of North Carolina at Chapel Hill, Jul. 24, 2006, pp. 1-16.

Primary Examiner — Harry Liu
(74) Attorney, Agent, or Firm — Global IP Counselors, LLP

(57) ABSTRACT

A highly accurate positioning operation is achieved regardless of an existence of multipath. An observed pseudorange $\rho_m(k)$ is acquired based on reception signals of positional signals (S101). A current determination estimated pseudorange $\rho_{mp}(k)$ is calculated based on a previous estimation result (S102). A determination difference value $\text{Delta}_{\rho m}(k)$ is calculated based on the observed pseudorange $\rho_m(k)$ and the estimated pseudorange $\rho_{mp}(k)$ (S103). A determination threshold $\sigma_{Delta\rho}$ is calculated based on a C/No of the reception signal and PDOP (S104). If the determination difference value $\text{Delta}_{\rho m}(k)$ is below the threshold $\sigma_{Delta\rho}$, an error variance $\sigma_{\rho m}(k)$ is calculated using an approximate equation of the C/No (S105(NO)→S106), and if the determination difference value $\text{Delta}_{\rho m}(k)$ is above the threshold $\sigma_{Delta\rho}$, the error variance $\sigma_{\rho m}(k)$ is calculated based on the threshold $\sigma_{Delta\rho}$ (S105(YES)→S107).

13 Claims, 6 Drawing Sheets

(51) Int. Cl.
*G01S 19/40* (2010.01)
*G01S 19/42* (2010.01)

(56) References Cited

U.S. PATENT DOCUMENTS 8,508,406 B2 * 8/2013 Rodriguez et al. ....... 342/357.61
2004/0259514 A1 * 12/2004 Nissila ...................... 455/226.1

2009/0128407 A1   5/2009   Xie et al.

FOREIGN PATENT DOCUMENTS

| JP | 2003-57327 A | 2/2003 |
| JP | 2006-322846 A | 11/2006 |
| JP | 2009-92541 A | 4/2009 |
| JP | 2009-139281 A | 6/2009 |

* cited by examiner

POSITIONING METHOD, GNSS RECEIVING APPARATUS, AND MOBILE TERMINAL

TECHNICAL FIELD

The present invention relates to a positioning method and a positioning program for performing a positioning by using positioning signals from GNSS satellites, and particularly relates to a positioning method and a positioning program for performing a positioning operation by using a track filter including an error covariance matrix.

BACKGROUND ART

Conventionally, many positioning devices for receiving positioning signals from GNSS satellites and performing a positioning have been put into practical use and used for various kinds of mobile terminals.

With such positioning devices, estimation calculations of positions or relative speeds of the own device are performed by substituting a pseudorange and carrier phases (delta ranges) that are observed using the positioning signals into track filters. Further, as the track filters, many Kalman filters such as the one disclosed in Nonpatent Document 1 have been used conventionally.

To such a conventional Kalman filter, a covariance matrix is given as a parameter to influence an estimation accuracy of the filter. Specifically, if it is a track filter for estimately calculating a pseudorange and a relative speed simultaneously, an error covariance matrix having an error variance of the pseudorange and an error variance of a relative positioning is given thereto.

Conventionally, the error variance of the pseudorange and the error variance of the relative positioning have simply been given with steady values or determined only by a C/No.

Further, Patent Document 1 discloses a positioning method of detecting multipath based on a difference value between an observed pseudorange and an estimated pseudorange so as not to use a reception signal (positioning signal) with a great error.

Further, Patent Document 2 discloses a positioning method of determining a reception environment based on a signal intensity, and correcting an error covariance of a Kalman filter according to the reception environment. In this method, the reception environment is determined in a stepwise manner, a correcting value is set for each step, and the original error covariance is corrected by the correcting value.

REFERENCE DOCUMENTS OF CONVENTIONAL ART

Patent Documents

Patent Document 1: JP2003-057327A
Patent Document 2: JP2009-092541A

Nonpatent Document

Nonpatent Document 1: Greg Welch, and Gary Bishop, "An Introduction to the Kalman Filter" Department of Computer Science, University of North Carolina at Chapel Hill, Chapel Hill, N.C. 27599-3175, Jul. 24, 2006

DISCLOSURE OF THE INVENTION

Problems to be Solved by the Invention

However, with the conventional method on the basis of the art of Nonpatent Document 1 described above, an estimation accuracy of the positioning result may be low. Specifically, for example, when an automobile installed with a positioning device and a positioning antenna travels in an urban area, there are cases where only direct positioning signals from positioning satellites are received and positioning signal(s) reflected on a tall construction around the automobile (multipath) are received. If such positioning signal(s) caused by the reflection from the surroundings are received and a positioning operation is performed by using the positional signal(s), a positioning error becomes greater.

Particularly, when each error variance in the error covariance matrix is set to a steady value or determined based only on a C/No as described above, there has been a case where the positioning error becomes greater due to receiving the influence of multipath.

Further, with the method in Patent Document 1, the positioning operation cannot be performed unless there is a predetermined (four) or higher number of positioning signals that do not receive the influence of multipath.

Further, with the method in Patent Document 2, the reception environment is determined based on the signal intensity and the error variance can only be corrected in a kind of manner based on a number of steps of the reception environment, and it is not certain that a highly accurate positioning operation according to multipath can be performed.

Therefore, the present invention aims to realize a positioning method and a positioning device for performing a positioning operation highly accurately without being influence by multipath.

SUMMARY OF THE INVENTION

The present invention relates to a method of positioning by estimating a position or a speed of a GNSS receiving apparatus by using a track filter based on reception signals of GNSS positioning signals. This positioning method includes detecting multipath, setting an error covariance matrix of observed errors serving as a parameter of designing the track filter, based on whether the multipath is detected, and estimating the position or the speed by using the track filter set in the setting the error covariance matrix.

In this method, the error covariance matrix of the observed errors is set according to the multipath. Thus, a most suitable track filter according to an appearance of the multipath can be set.

Further, the positioning method of the invention may further include calculating an observed pseudorange to a GNSS receiving apparatus based on a code phase difference of reception signals received at a first time point, and calculating an estimated pseudorange based on a position of a satellite at the first time point and a position of the GNSS receiving apparatus at the first time point that is calculated based on a position and a speed of the GNSS receiving apparatus at a second time point that is before the first time point. The detecting the multipath may include detecting the multipath based on the observed pseudorange and the estimated pseudorange.

In this method, a method of detecting multipath is shown. By using this method, multipath can accurately be detected. In this manner, the error covariance matrix of the observed errors according to the multipath can accurately be set.

Further, the positioning method may further include setting a threshold based on a position accuracy degradation serving as an index of a positioning accuracy based on locations of GNSS satellites and a C/No. The detecting the multipath may include detecting the multipath based on a result of comparing a difference value between the observed pseudorange and the estimated pseudorange with the threshold.

In this method, a specific method of detecting multipath is shown.

Further, the setting the covariance matrix in the positioning method of this invention may include setting, when the multipath is detected in the detecting the multipath, an error variance of the error covariance matrix based on the threshold, and on the other hand, the setting the covariance matrix may include setting, when the multipath is not detected in the detecting the multipath, the error variance based on the C/No.

In this method, a specific method of setting the observed error according to multipath is shown.

Further, in the positioning method of this invention, the error variance when the multipath is detected may be the threshold, and the error variance when the multipath is not detected may be a value calculated by using an approximate equation of an index function with the C/No that is obtained empirically in advance.

In this method, specific methods of setting the error variance when the multipath is detected and is not detected are shown.

Further, in the positioning method of this invention, the threshold set for the error variance when the multipath is detected may be corrected by being multiplied by a predetermined correction coefficient.

In this method, a specific method of setting the threshold is shown. By correcting the threshold, a suitable error variance according more to the multipath can be set.

Further, in the positioning method of this invention, the correction coefficient for a pseudorange may be different from the correction coefficient for a relative speed.

In this method, a specific method of setting the correction coefficient is shown. In this manner, a threshold according to respective situations of the pseudorange and the relative speed can be set.

Further, in the positioning method of this invention, the threshold may be set based on a $\chi^2$ test result in which an observed value is used as the observed pseudorange and an expected value is used as the estimated pseudorange.

With this configuration, a more specific method of setting the threshold is shown.

Effect of the Invention

According to this invention, an error covariance matrix suitable according to each situation can be set without being influenced by the existence of the multipath. In this manner, a result of an estimation operation using a track filter becomes highly accurate, and a position and a relative speed of the own device can be calculated highly accurately.

MODE OF CARRYING OUT THE INVENTION

Figure 1:
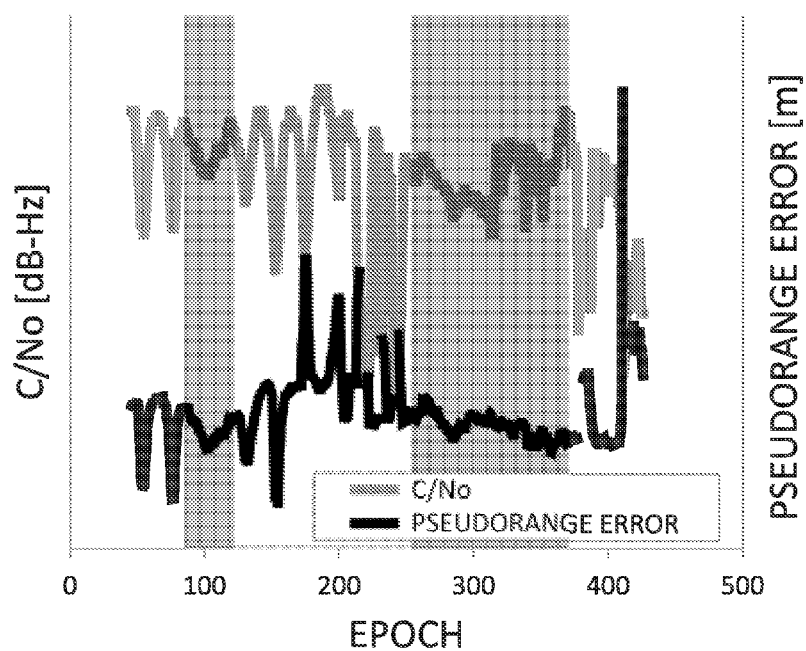
FIG. 1 is a chart of an experimental result showing time transitions of a C/No and a pseudorange error when a GPS signal from a specific GPS satellite is received with time.

A positioning method, and a positioning program and a positioning device for realizing the method according to an embodiment of the invention are described with reference to the drawings. Note that, the positioning method, the positioning program, and the positioning device of this embodiment can be applied to any positioning system using GNSS.

Further, although an example in which Kalman filter is used as a track filter is shown in the following description, the method of the present application can be applied as long as it is an estimation operation in which parameter setting for the filter can be performed by an error covariance matrix.

In the positioning method of this embodiment, a track filter indicated by the following Equation 1 is used.

$$\rho\rho(k) = HH \cdot xx(k) + v(k) \qquad (1)$$

In the track filter indicated by this Equation 1, $\rho\rho(k)$ is an observed vector at an operation timing k, and $xx(k)$ is a state vector at the operation timing k. Moreover, HH is a direction cosine matrix and $v(k)$ is an observed error at the timing k. The observed error $v(k)$ conforms an error covariance matrix $RR(k)$ and a multivariate normal (or Gaussian) distribution with zero mean. Therefore, the observed error $v(k)$ is defined by $v(k) \sim N(0, RR)$.

The observed vector $\rho\rho(k)$ is expressed by the following equation.

$$\rho\rho(k) = \begin{bmatrix} \rho_1(k) \\ \vdots \\ \rho_n(k) \\ \Delta\rho_1(k) \\ \vdots \\ \Delta\rho_n(k) \end{bmatrix} \qquad (2)$$

In Equation 2, $\rho 1(k)$-$\rho n(k)$ are observed pseudoranges of positioning satellites SV(1)-SV(n) to the own device, respectively, and $\Delta\rho 1(k)$-$\Delta\rho n(k)$ are observed delta ranges (Doppler shifts), respectively.

The state vector $xx(k)$ are expressed by the following equation.

$$xx(k) = \begin{bmatrix} x(k) \\ y(k) \\ z(k) \\ t(k) \\ \Delta x(k) \\ \Delta y(k) \\ \Delta z(k) \\ \Delta t(k) \end{bmatrix} \qquad (3)$$

In Equation 3, [x(k), y(k), z(k)] is an estimated position of the own device in an orthogonal coordinate system, [t(k)] is a receiver clock error of the own device, [$\Delta x(k)$, $\Delta y(k)$, $\Delta z(k)$] is a relative speed of the own device in the orthogonal coordinate system, and [$\Delta t(k)$] is a variation amount of the receiver clock error of the own device.

The direction cosine matrix HH is expressed by the following equation.

$$HH = \begin{bmatrix} Hmx & 0mx \\ 0mx & Hmx \end{bmatrix} \quad (4)$$

In Equation 4, Hmx is a direction cosine matrix regarding the pseudorange and the relative speed. Here, the direction cosine matrix Hmx has (the number of satellites)×4 elements, and in the direction cosine matrix HH, matrix elements other than the direction cosine matrix Hmx are "0", and they are expressed as a matrix of 0mx in the equation.

Moreover, the error covariance matrix RR(k) for determining the observed error v(k) is expressed by the following equation.

$$RR(k) = \begin{bmatrix} \sigma^2_{\rho 1}(k) & & & & & \\ & \ddots & & & 0mx & \\ & & \sigma^2_{\rho n}(k) & & & \\ & & & \sigma^2_{\Delta\rho 1}(k) & & \\ & 0mx & & & \ddots & \\ & & & & & \sigma^2_{\Delta\rho n}(k) \end{bmatrix} \quad (5)$$

In Equation 5, each of $\sigma^2_{\rho 1}(k)$-$\sigma^2_{\rho n}(k)$ is an error variance regarding the pseudorange for each of positioning satellites SV(1)-SV(n), and each of $\sigma^2_{\Delta\rho 1}(k)$-$\sigma^2_{\Delta\rho n}(k)$ is an error variance regarding the relative speed for each of positioning satellites SV(1)-SV(n). In the error covariance matrix RR(k), matrix elements other than the error variance $\sigma^2_{\rho 1}(k)$-$\sigma^2_{\rho n}(k)$ and $\sigma^2_{\rho 1}(k)$-$\sigma^2_{\rho n}(k)$ are "0", and they are expressed as a matrix of 0mx in the equation.

Further, by setting the observed error v(k) based on Equation 5 and substituting the observed error v(k) and Equations 2-4 into Equation 1, the track filter indicated in the following equation can be obtained.

$$\begin{bmatrix} \rho_1(k) \\ \vdots \\ \rho_n(k) \\ \Delta\rho_1(k) \\ \vdots \\ \Delta\rho_n(k) \end{bmatrix} = \begin{bmatrix} Hmx & 0mx \\ 0mx & Hmx \end{bmatrix} \cdot \begin{bmatrix} x(k) \\ y(k) \\ z(k) \\ t(k) \\ \Delta x(k) \\ \Delta y(k) \\ \Delta z(k) \\ \Delta t(k) \end{bmatrix} + v(k) \quad (6)$$

In such track filter, the state vector xx(k) corresponds to a value calculated based on the estimation operation, and the observed vector ρρ(k) corresponds to an observed value that can be acquired based on the reception signals. Further, the direction cosine matrix HH is a matrix for linear mapping between an estimated position and an observed pseudorange, and an estimated relative speed and an observed delta range, and the direction cosine matrix HH is set by a well-known method in advance.

The error variance $\sigma^2_{\rho 1}(k)$-$\sigma^2_{\rho n}(k)$ and $\sigma^2_{\rho 1}(k)$-$\sigma^2_{\rho n}(k)$ are suitably set according to the appearance of multipath by using the method described as follows.

FIG. 1 is a chart of an experimental result illustrating a multipath dependency of a C/No and a pseudorange error, in which time transitions of the C/No and the pseudorange error when a GPS signal from a specific GPS satellite is received with time is illustrated. Note that, this experiment is executed under a condition that the position of the own device, that is the true pseudorange, is in a well-known state.

The pseudorange error in FIG. 1 is a difference value between the pseudorange and the true pseudorange at each epoch. The pseudorange is calculated based on a result of integrating code correlation results of the reception signals for a predetermined time length (e.g., for 1 second) toward the past with respect to each count timing. Further, the C/No in FIG. 1 is calculated based on the result of integrating the correlation results obtained by a two-dimensional correlation spectrum of the reception signals for a predetermined time length (e.g., for 1 second) toward the past with respect to each epoch.

As illustrated in FIG. 1, in the time ranges where the epoch is between about 80 and 120 and between about 250 and 360 which are hatched sections, the pseudorange error is approximately "0", and it is considered to be highly possible that multipath is not caused in those time ranges but it is highly possible to occur in other time ranges.

Here, as illustrated in FIG. 1, the C/No is stable in the time ranges where multipath does not occur (hatched time ranges) but the pseudorange error and the C/No vary in the time range where multipath occurs (time ranges other than the hatched time ranges).

Therefore, by setting the error covariance matrix separately for the time range where multipath occurs (the time range determined to have high multipath) and the time range where multipath does not occur (the time range determined to have low multipath or hardly have multipath), the error covariance matrix can be set based more on the situation compared to setting the error covariance matrix simply by the C/No.

Note that, because the error variance setting method is the same for each of the positioning satellites SV1-SVn ("n" is an integral number and corresponds to the number of positioning satellites that are available for observation), the method of setting the error variance is described with the assumption of using a specific positioning satellite SVm ("m" is an arbitrary integral number below "n", which is used for convenience in description).

Figure 2:
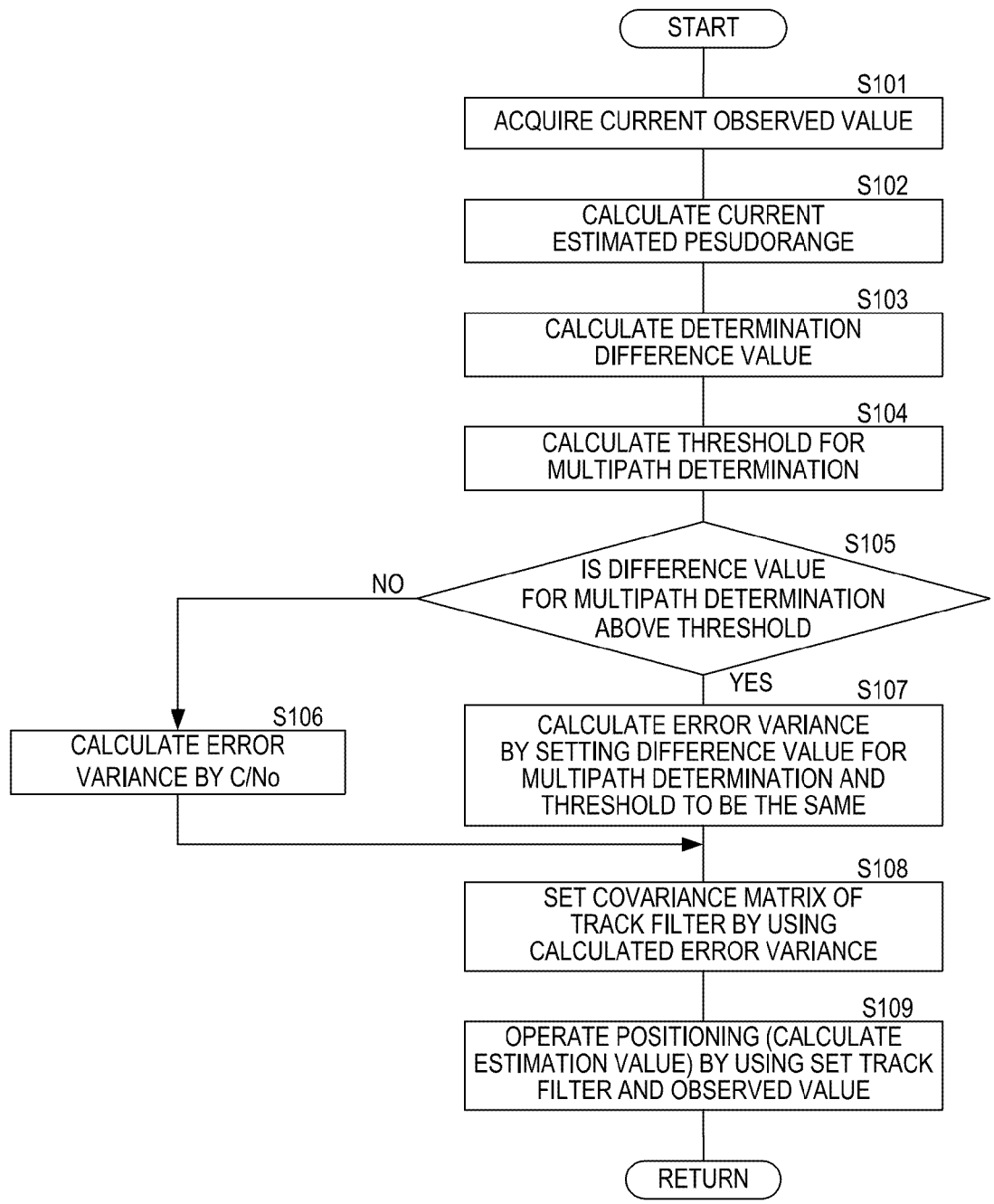
FIG. 2 is a flowchart of a positioning operation according to an embodiment of the invention.

FIG. 2 is a flowchart of the positioning operation of this embodiment. The error variance setting method, the setting method of the error covariance matrix of the track filter, and the flow of positioning operation are described along the flowchart. The case of using the position of the own device as an estimated value is exemplary described.

At the operation timing k, an observed pseudorange $\rho_m(k)$ is calculated from a code phase difference of the reception signals based on the positioning signals from the positioning satellite SVm (FIG. 2: S101). Here, the operation timing k has a predetermined time interval (e.g., 1 second interval) to the next timing, and the observed pseudorange $\rho_m(k)$ is calculated based on an integrated value of a code phase error in epochs included between the current timing and an immediate previous timing k−1 thereof.

Along with such calculation of an observed pseudorange $\rho_m(k)$, an estimated pseudorange $\rho_{mp}(k)$ for determination is calculated (FIG. 2: S102). Here, by using a calculated position Pos(k−1) and a calculated relative speed Vel(k−1) that are the estimation results at the previous timing (k−1), as well as using a position Pss(k) of a positioning satellite $SV_m(k)$ at the current timing (k) obtained from satellite orbit information contained in a navigation message, the determination estimated pseudorange $\rho_{mp}(k)$ can be given by using the following equation. Note that, "Tint" in the following equation is a time interval between the operation timings (k−1) and (k), and the symbols surrounded by double vertical lines in the following equation indicates operation symbols that mean to calculate a three-dimensional distance.

$$\rho_{mp}(k) = \|Pss(k) - (Pos(k-1) + Vel(k-1) \cdot Tint)\| \quad (7)$$

Subsequently, as indicated by the following equation, a difference value $\text{Delta}_{\rho m}(k)$ for determination is calculated based on the observed pseudorange $\rho_m(k)$ and the determination estimated pseudorange $\rho_{mp}(k)$ (FIG. 2: S103).

$$\text{Delta}_{\rho m}(k) = \rho_m(k) - \rho_{mp}(k) \quad (8)$$

If the determination difference value $\text{Delta}_{\rho m}(k)$ calculated as above is above a threshold $\sigma_{Delta\rho}$ tap of which a setting method is shown next, multipath is determined to be high, and if the determination difference value $\text{Delta}_{\rho m}(k)$ calculated as above is below the threshold $\sigma_{Delta\rho}$, multipath is determined to have a value such that it is low or hardly exists.

This threshold $\sigma_{Delta\rho}$ is calculated by using the following equation (FIG. 2: S104).

$$\sigma_{Delta\rho} = \sqrt{\sigma_{POS}^2 + \sigma_{vel}^2} \quad (9)$$

In Equation 9, $\sigma^2_{POS}$ is the accuracy of the position calculated previously, and $\sigma^2_{Vel}$ is the accuracy of the relative speed calculated previously.

The position accuracy $\sigma^2_{POS}$ is calculated by using the following equation.

$$\sigma_{POS}^2 = PDOP^2 \cdot \sigma_{\rho CN}^2 \quad (10)$$

In Equation 10, $\sigma^2_{\rho CN}$ is an error variance of a pseudorange under a situation in which the C/No of the reception signal is set to a specific value (e.g., 45 [dB-Hz]), and PDOP is an index value of a positioning accuracy based on satellite locations. PDOP corresponds to a position accuracy degradation of the invention.

Moreover, the relative speed accuracy $\sigma^2_{Vel}$ is calculated by using the following equation.

$$\sigma_{Vel}^2 = PDOP^2 \cdot \sigma_{\Delta\rho CN}^2 \quad (11)$$

In Equation 11, $\sigma^2_{\Delta\rho CN}$ is an error variance of a delta range under a situation in which the C/No of the reception signal is set to a specific value (e.g., 45 [dB-Hz]).

Note that, the error variance $\sigma^2_{\rho CN}$ of the pseudorange can be approximated from the following equation.

$$\sigma_{\rho CN}^2 = \left[a_0 + a_1 \cdot \exp\left(-\frac{C/No}{a_2}\right)\right]^2 \quad (12)$$

In Equation 12, $a_0$, $a_1$, and $a_2$ are coefficients suitably set, and the C/No is the specific value as described above.

Similarly, the error variance $\sigma^2_{\Delta\rho CN}$ of the delta range is calculated by using the following equation.

$$\sigma_{\Delta\rho CN}^2 = \left[a_3 + a_4 \cdot \exp\left(-\frac{C/No}{a_5}\right)\right]^2 \quad (13)$$

In Equation 13, $a_3$, $a_4$, and $a_5$ are coefficients suitably set, and the C/No is the specific value as described above.

Moreover, the threshold $\sigma_{Delta\rho}$ is corrected by a coefficient K that is set based on a $\chi^2$-test result obtained from Equation A.

The $\chi^2$-test performed here is based on a previous observed pseudorange and the estimated pseudorange. The estimated pseudorange is calculated from the position and the relative speed of a GNSS receiving apparatus estimated immediately previously, a time interval between the timing of the immediate previous estimation and the timing of the $\chi^2$-test, and a positioning satellite position at the timing of the $\chi^2$-test. Moreover, a $\chi^2$ value is calculated by using Equation A shown as follows.

$$\chi^2 = \sum_{L=1}^{n} \left(\frac{(\rho_{mL} - \rho_{mpmL})^2}{\rho_{mpmL}}\right) \quad (A)$$

If the $\chi^2$ value is a predetermined determination reference value of "1" (significance level of 1%) or below, the $\chi^2$-test result is adopted, and if the $\chi^2$ value is above the predetermined determination reference value, the $\chi^2$-test result is rejected.

In the actual operation, the correction is performed by multiplying the threshold $\sigma_{Delta\rho}$ by the coefficient K.

The value of coefficient K is set smaller when the $\chi^2$-test is adopted than when it is rejected. In other words, the value of coefficient K is set smaller when the estimated value is estimated accurately with respect to the observed value than when the estimated value is not estimated accurately with respect to the observed value. In this manner, the threshold in the situation in which the observed value is stable is set smaller than the threshold in the situation in which the observed value is not stable. Thus, the multipath determination criteria can be stricter in the stable situation than in the unstable situation.

Note that, such correction of the threshold $\sigma_{Delta\rho}$ is not necessary to be performed but a further suitable threshold can be obtained by performing the correction.

Next, the determination difference value $\text{Delta}_{\rho m}(k)$ and a threshold $K\sigma_{Delta\rho}$ that is the threshold $\sigma_{Delta\rho}$ multiplied by K (referred to as "the correction threshold" for convenience in description) are compared to each other. Here, if the determination difference value $\text{Delta}_{\rho m}(k)$ is below the correction threshold $K\sigma_{Delta\rho}$(ABS($\text{Delta}_{\rho m}(k)$)<$K\sigma_{Delta\rho}$), multipath is determined to be low or hardly exists, and a method of calculating an error variance $\sigma^2_{\rho L}$ (L is any of 1 to n) from an approximate equation based on C/No indicated by Equation 12 described above is used (FIG. 2: S105(NO)→S106).

On the other hand, if the determination difference value $\text{Delta}_{\rho m}(k)$ is above the correction threshold $K\sigma_{Delta\rho}$(ABS($\text{Delta}_{\rho m}(k)$)≥$K\sigma_{Delta\rho}$), multipath is determined to be high and a method of calculating the error variance $\sigma^2_{\rho L}$ (L is any of 1 to n) based on the correction threshold is used (FIG. 2: S105(YES)→S107).

Figure 3A:
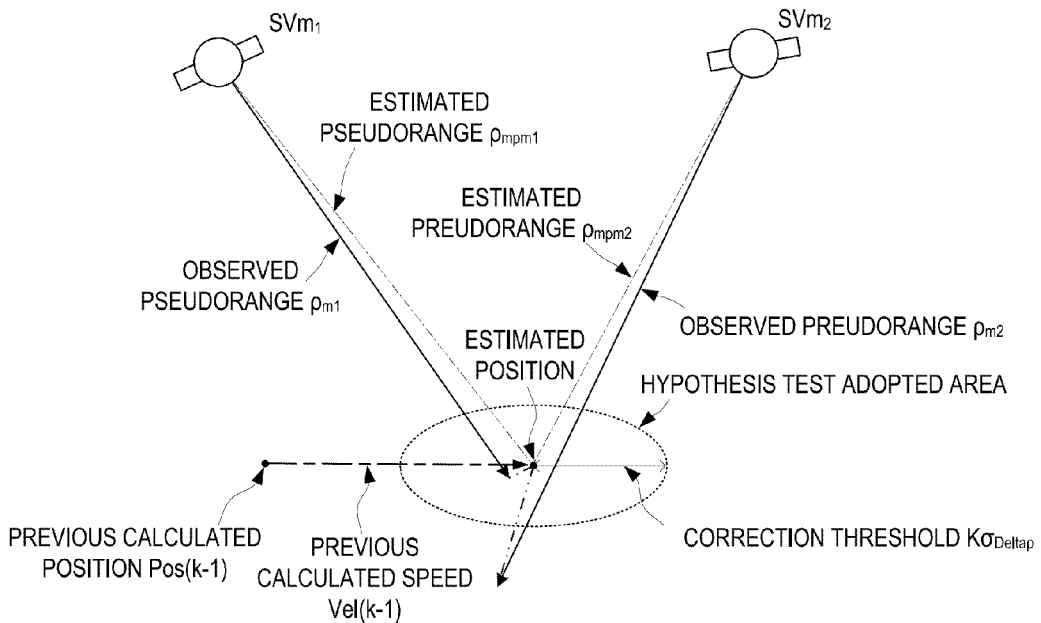
FIGS. 3(A) and 3(B) are views illustrating a determination concept of multipath.
Figure 3B:
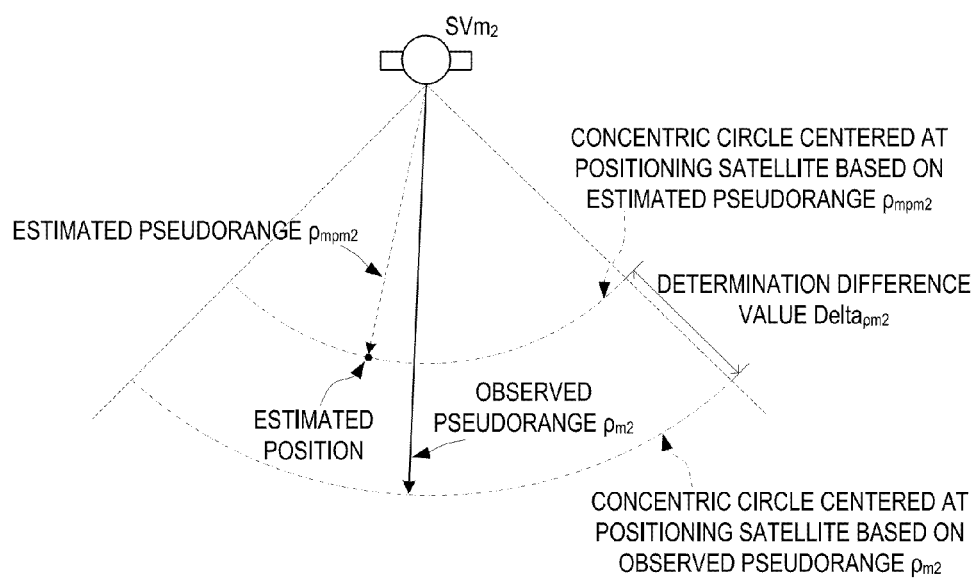

Here, FIGS. 3(A) and 3(B) illustrate such multipath determination processing illustrated in conceptual views. FIGS. 3(A) and 3(B) are views illustrating a determination concept of multipath. FIG. 3(A) is a three-dimensionally viewed conceptual view, and FIG. 3(B) is a two-dimensionally projected view for describing the determination difference value $\text{Delta}_{\rho m}(k)$. Note that, FIG. 3(B) illustrates a case of using a positioning satellite $SVm_2$. As illustrated in FIGS. 3(A) and 3(B), for a positioning satellite $SVm_1$, a position that is to be obtained by the observation based on an observed pseudorange $\rho_{m1}(k)$ is close to an estimated position based on an estimated pseudorange $\rho_{mpm1}(k)$ for determination. In this case, a difference value $\text{Delta}_{\rho m1}(k)$ for determination between the observed pseudorange $\rho_{m1}(k)$ and the determination estimated pseudorange $\rho_{mpm1}(k)$ is small and settles within an internal area of a hypothesis test adopted area determined by the correction threshold $K\sigma_{Delta\rho}$. In such a case, an observation result and an estimation result highly possibly become similar to each other, a reception state stabilizes, and it can be determined that multipath is low or hardly exists.

On the other hand, for a positioning satellite $SVm_2$, a position that is to be obtained by the observation based on an observed pseudorange $\rho_{mpm}(k)$ is far from an estimated position based on an estimated pseudorange $\rho_{mpm2}(k)$ for determination. In this case, a difference value $\text{Delta}_{\rho m2}(k)$ for determination between the observed pseudorange $\rho_{m2}(k)$ and the determination estimated pseudorange $\rho_{mpm2}(k)$ is large and reaches outside the hypothesis test adopted area determined by the correction threshold $K\sigma_{Delta\rho}$. In such a case, the observation result and the estimation result highly possibly become unlike each other, a reception state becomes unstable, and it can be determined that multipath is high.

Thus, because the situation is different between a case where multipath is low (hardly exists) and a case where multipath is high, setting of the error variance configuring the error covariance matrix $RR(k)$ serving as a parameter for designing the track filter is different according to the respective situations.

Returning to the description of the processing, a method of setting the error variance $\sigma^2_\rho$ when the determination difference value $\text{Delta}_{\rho m}(k)$ is above the correction threshold $K\sigma_{Delta\rho}$, that is when it can be determined that multipath is high.

In such a case, it can be thought that the error of the pseudorange accounts most of the error. Therefore, the error is considered to be equal to the difference value between the observed value and the estimated value, and the result of multiplication of a standard deviation of the error by the coefficient K and the determination difference value are set to be equal as indicated by the following equation.

$$\text{Delta}_{\rho m}(k) = K\sigma_{Delta\rho} \tag{14}$$

By modifying this Equation 14, Equation 15 can be obtained.

$$\sigma^2_{Delta\rho} = \left(\frac{\text{Delta}_{\rho m}(k)}{K}\right)^2 \tag{15}$$

Here, the coefficient $K=1$. Note that, when correcting the threshold described above, that is when setting the hypothesis test adopted area shown in FIG. 3(A), the coefficient K is set to have a larger value when the $\chi^2$-test is rejected based on the $\chi^2$-test result than when it is adopted (e.g., K=1 when adopted, K=2 when rejected), and thus, the coefficient K may be used with the different setting conditions. However, the number of error factors is larger and the error of the pseudorange highly possibly becomes larger when the $\chi^2$-test is rejected. Therefore, K is set smaller even when the $\chi^2$-test is rejected here. In this manner, because the value of the error variance becomes large, the error variance for the positioning satellite for which the $\chi^2$-test is rejected can be set more suitably.

Next, by using Equations 9, 10, and 11 described above to modify Equation 15 the error variance $\sigma^2_\rho(k)$ of the pseudorange can be expressed as the following equation.

$$\sigma^2_\rho(k) = \frac{\text{Delta}^2_{\rho m}(k) - \sigma^2_{vel}(k-1)}{PDOP} \tag{16}$$

In this Equation 16, the determination difference value $\text{Delta}_{\rho m}(k)$ is obtained from an observed pseudorange $\rho_m(k)$ and an estimated pseudorange $\rho_{mp}(k)$ for determination as indicated in Equation 8 described above. Further, PDOP can be calculated by a well-known calculation method based on an on-diagonal element of the direction cosine matrix. Moreover, a variance $\sigma^2_{vel}(k-1)$ of the relative speed is obtained based on the relative speed estimated previously. Therefore, the error variance $\sigma^2_\rho(k)$ of the pseudorange can be calculated by substituting these values into Equation 16.

An error variance $\sigma^2_{\Delta\rho m}(k)$ of the delta range $\Delta\rho_m(k)$ can also be set by calculating the determination difference value similar to the error variance $\sigma^2_\rho(k)$ of the pseudorange described above.

The determination difference value $\text{Delta}_{\Delta\rho m}$ for the case with the delta range $\Delta\rho_m(k)$ is obtained from the following equation corresponding to Equation 8 for the pseudorange $\rho_m(k)$.

$$\text{Delta}_{\Delta\rho m}(k) = \Delta\rho_m(k) - \Delta\rho_{mp}(k) \tag{17}$$

In Equation 17, $\Delta\rho_{mp}(k)$ is an estimated delta range for determination.

The determination estimated delta range can be calculated by using the following equation.

$$\Delta\rho_{mp}(k) = \|SvVel(k) - Vel(k-1)\| \tag{18}$$

In Equation 18, $SvVel(k)$ is a speed of a current positioning satellite $SV(m)$ obtained from the satellite orbit information in the navigation message, and $Vel(k-1)$ is the estimated relative speed of the own device obtained from the previous estimation result.

By using the determination difference value $\text{Delta}_{\Delta\rho m}$ set as above, the determination difference value $\text{Delta}_{\Delta\rho m}$, is determined whether it is below or above the threshold $\sigma_{Delta\rho}$, a similar to the pseudorange described above. Further, if the determination difference value $\text{Delta}_{\Delta\rho m}$ is below the threshold $\sigma_{Delta\rho}$, an error variance $\sigma^2_{\Delta\rho m}(k)$ of the determination estimated delta range is calculated by using Approximate Equation 13 of the C/No, similar to the case of the pseudorange.

On the other hand, if the determination difference value $\text{Delta}_{\Delta\rho m}$, is above the threshold $\sigma_{Delta\rho}$, the error variance $\sigma^2_{\Delta\rho m}(k)$ is calculated based on the concept indicated as follows.

First, variances on both-hand sides in Equation 17 are removed.

$$\sigma_{Delta_{\Delta\rho m}}^2(k) = \sigma\Delta\rho_m^2(k) + \sigma\Delta\rho_{mp}^2(k) \tag{19}$$

Here, the determination difference value and the error are considered to match with each other, similar to Equation 14 for the pseudorange described above, and the following equation is set.

$$\sigma^2_{Delta\Delta\rho} = \left(\frac{\text{Delta}_{\Delta\rho m}(k)}{K}\right)^2 \tag{20}$$

Further, the error variance $\sigma^2_{\Delta\rho m}(k)$ of the determination estimated delta range can be calculated from the product of the previous error variance $\sigma^2_{\Delta\rho m}(k-1)$ and PDOP, and is expressed as the following equation.

$$\sigma_{\Delta\rho_{mp}}^2(k) = PDOP^2 \cdot \sigma^2_{\Delta\rho m}(k-1) \tag{21}$$

Further, the delta range has a smaller observed error than the pseudorange, and thus, a previous observed error and a current observed error can be assumed as being the same. Therefore, by substituting Equations 20 and 21 into Equation 19 to modify as $\sigma_{\Delta\rho m}(k-1) = \sigma_{\Delta\rho m}(k)$, the following equation is obtained.

$$\sigma^2_{\Delta\rho m}(k) = \frac{\sigma^2_{Delta\Delta\rho}}{K^2 \cdot (1+PDOP)^2} \quad (22)$$

In Equation 22, because the left-hand side indicates the error variance of the delta range, and each element on the right-hand side is a value that can be calculated from an observed value, the previous estimated value, and the direction cosine matrix, by using the equation, the error variance $\sigma^2_{\Delta\rho m}(k)$ of the delta range can also be calculated.

Such calculation of each of the error variances $\sigma^2_{\rho m}(k)$ and $\sigma^2_{\Delta\rho m}(k)$ is executed for each positioning satellite Sv1-SVn. Further, the error covariance matrix RR(k) is set by using each of the calculated error variances $\sigma^2_{\rho m}(k)$ and $\sigma^2_{\Delta\rho m}(k)$ (FIG. 2: S108).

Further, the observed error v(k) is set based on the error covariance matrix RR(k) which is set based on the pseudorange and the error variances of the delta range. Moreover, by substituting the observed pseudorange and the observed delta range configuring these observed error v(k) and observed vector ρρ(k) into the track filter indicated in Equation 6, the position operation is executed and the estimated position and the estimated relative speed are calculated (FIG. 2: S109).

By performing the processing as above, the error variance suitable according to the appearance of multipath is set. In this manner, a highly accurate positioning result can be obtained without being influenced by the appearance of multipath.

Figure 4:
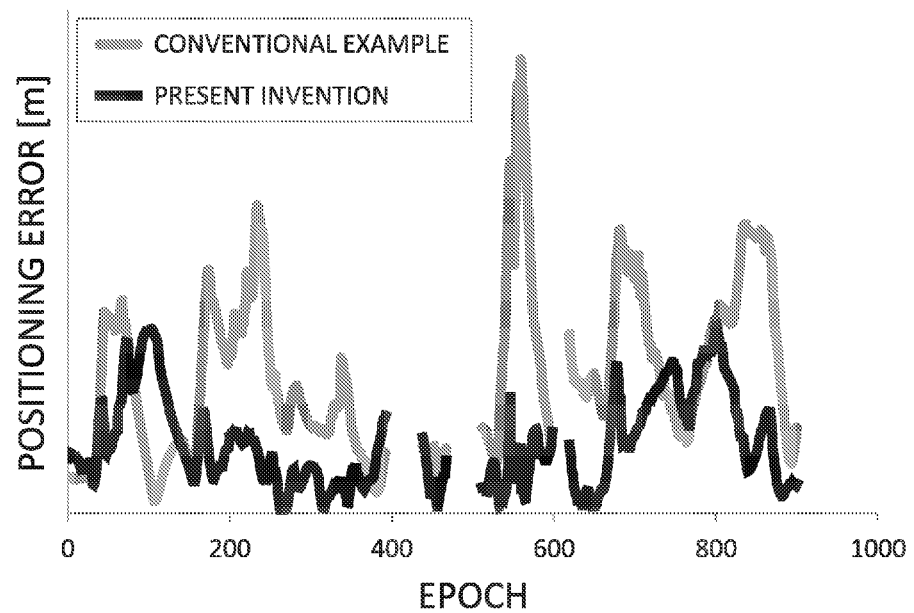
FIG. 4 is a chart illustrating pseudorange estimation results in processing of the embodiment and the conventional processing of fixing each error variance of an error covariance matrix.

FIG. 4 is a chart illustrating the estimation result of the positioning error in a horizontal direction between the processing of this embodiment and the processing of fixing each error variance of the conventional error covariance matrix, in which the lateral axis indicates epoch corresponding to time, and the vertical axis indicates the positioning error. As illustrated in FIG. 4, by using the processing of this embodiment, the positioning error can be reduced compared to the conventional processing, regardless of the appearance of multipath.

Note that, although the difference between settings of the coefficient K for the pseudorange and for the delta range is not shown particularly in the description above, the settings may be the same or different. For example, in a situation in which the estimated relative speed seems to be more accurate than the estimated position, the coefficient $K_A$ to be set for the delta range is set smaller than the coefficient $K_\rho$ to be set for the pseudorange. For example, when the coefficient $K_\rho$ for the pseudorange is a one-digit value, the coefficient $K_A$ for the delta range is set to about $10^{-1}$ or $10^{-3}$. In this manner, the track filter in which the estimation result of the relative speed is focused on can be set.

Figure 5:
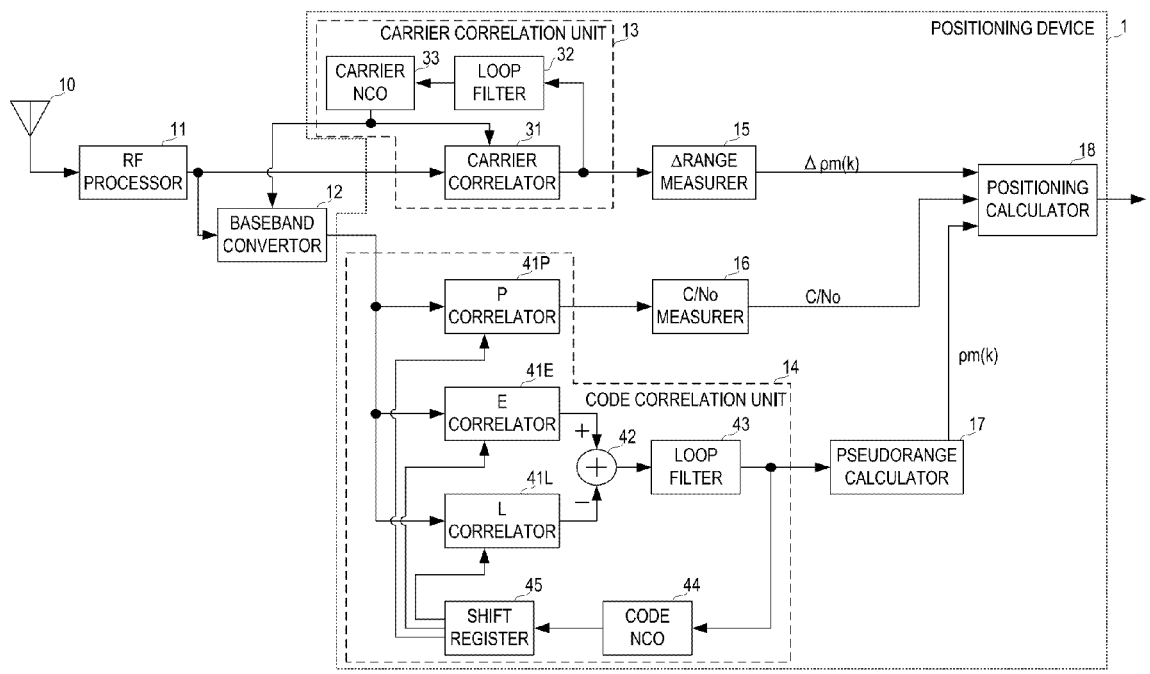
FIG. 5 is a block diagram illustrating a main configuration of a positioning device 1 of the embodiment.

Next, the configuration of the device for achieving such positioning operation processing is described with reference to the drawings. FIG. 5 is a block diagram showing a main configuration of the multipath detecting function system of this embodiment.

As illustrated in FIG. 5, the positioning device 1 of this embodiment includes a carrier correlation unit 13, a code correlation unit 14, a delta range measurer 15, a C/No measurer 16, a pseudorange calculator 17, and a positioning operator 18. Although an example of configuring the carrier correlation unit 13 and the code correlation unit 14 in separate loops is shown in this embodiment, a so called code-carrier integrated tracking loop in which a so called code correlation result is used in carrier correlation processing and the carrier correlation result is used in code correlation processing.

These carrier correlation unit 13 and the code correlation unit 14 are connected with a baseband convertor 12. The baseband converter 12 is inputted with an IF signal obtained in down-converting a GPS signal received by an antenna 10 to an intermediate frequency by an RF processor 11. The baseband converter 12 uses a carrier frequency signal from a carrier NCO 33 of the carrier correlation unit 13 to convert the IF signal into a code signal of the baseband and outputs it to the code correlation unit 14.

The carrier correlation unit 13 includes a carrier correlator 31, a loop filter 32, and the carrier NCO 33. The carrier correlator 31 multiplies the carrier frequency signal from the carrier NCO 33 by the IF signal of the RF processor 11 and outputs a carrier phase difference therebetween. The outputted carrier phase difference is fed back to the carrier NCO 33 via the loop filter 32. Further, the carrier phase difference is also outputted to the delta range measurer 15.

The code correlation unit 14 includes a P correlator 41P, an E correlator 41E, an L correlator 41L, an adder 42, a loop filter 43, a code NCO 44, and a shift register 45.

The code correlation unit 14 is a correlation unit for performing code tracking by performing a so called Early-Late correlation.

The P correlator 41P multiplies a Punctual replica code by the code signal from the baseband convertor 12 and outputs Punctual phase difference data. The E correlator 41E multiplies an Early replica code of which a code phase is ½ chip ahead of the Punctual replica code by the code signal from the baseband convertor 12 and outputs Early phase difference data. The L correlator 41L multiplies a Late replica code of which a code phase is ½ chip behind the punctual replica code by the code signal from the baseband convertor 12 and outputs Late phase difference data. Note that, in this embodiment, although each phase difference among the Early, Punctual and Late is ½ chip, it may suitably be set according to the situation.

The adder 42 finds a difference between the Early phase difference data and the Late phase difference data, and creates E-L correlation data. The E-L correlation data is fed back to the code NCO 44 via the loop filter 43 as well as outputted to the pseudorange calculator 17.

The code NCO 44 creates a replica code based on the E-L correlation data, and outputs it to the shift register 45. The shift register 45 creates an Early replica code, a Punctual replica code, and a Late replica code of which the code phases vary by ½ chip from each other, based on the replica code from the code NCO 44. The punctual replica code is outputted to the P correlator 41P, the Early replica code is outputted to the E correlator 41E, and the Late replica code is outputted to the L correlator 41L in synchronization thereto, respectively.

The delta range measurer 15 calculates the observed delta range $\Delta\rho_m(k)$ by calculating the Doppler frequency based on the carrier phase difference and integrating the predetermined time length of the Doppler frequencies (e.g., 1 second).

The C/No measurer 16 stores the Punctual phase difference data from the code correlation unit 14 for the predetermined time length (e.g., for 1 second), performs frequency conversion processing, such as FFT processing, on a plurality of stored Punctual phase difference data aligned on a time axis, and measures the C/No based on the two-dimensional correlation spectrum configured with a spectrum on the time axis and the spectrum on a frequency axis. Note that, although the two-dimensional correlation spectrum is used here, a different method may be used.

The pseudorange calculator 17 calculates the observed pseudorange $\rho_m(k)$ by a well-known method based on the E-L correlation data from the code correlation unit 14.

The positioning operator 18 sets the error variances $\sigma^2_{\rho m}(k)$ and $\sigma^2_{\delta\rho m}(k)$ according to the appearance of multipath as described above by using the observed delta range $\Delta\rho_m(k)$ inputted from the delta range measurer 15 and the observed pseudorange $\rho_m(k)$ inputted sequentially from the pseudorange calculator 17, as well as using the demodulated navigation message.

Next, the positioning operator 18 sets the error covariance matrix RR(k) of the track filter of Equation 6 described above by using the set error variances $\sigma^2_{\rho m}(k)$ and $\sigma^2_{\delta\rho m}(k)$, and by substituting the observed pseudorange $\rho_m(k)$ and the observed delta range $\Delta\rho_m(k)$ into the track filter of Equation 6, the position and relative speed of the own device and the like is estimately calculated and outputted.

Note that, in the description above, the example in which the positioning method described above is achieved with the configuration constituted with function blocks is shown. However, the positioning method described above may be programmed and stored in a memory so as to execute positioning operation processing by a CPU performing a processing operation of the program.

Figure 6:
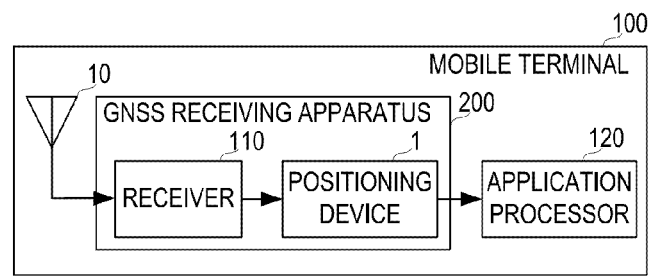
FIG. 6 is a block diagram illustrating a main configuration of a mobile terminal 100 including the positioning device 1 of the embodiment.

Moreover, such a positioning device 1 or a positioning operation function is used in a mobile terminal 100 as illustrated in FIG. 6. FIG. 6 is a block diagram illustrating a main configuration of the mobile terminal 100 having the positioning device 1 of this embodiment.

The mobile terminal 100 as illustrated in FIG. 6 is, for example, a mobile phone, a car navigation system, a PND, a camera, or a watch, and includes the antenna 10, a receiver 110, the positioning device 1, and an application processor 130. The receiver 110 and the positioning device 1 constitute a GNSS receiving apparatus 200.

The antenna 10 is the same as the antenna shown in FIG. 5, and the receiver 110 is a function unit corresponding to the FR processor 11 and the baseband converter 12 of FIG. 5.

The positioning device 1 illustrated in FIG. 6 is the positioning device 1 in FIG. 5 described above or a positioning operation function system. It estimately calculates a position, a relative speed or the like of the own device and outputs it to the application processor 130.

Based on the obtained positioning result, the application processor 130 displays the position or the speed of the own device and executes processing for being used in navigation, etc.

According to such a configuration, since a highly accurate positioning result as described above can be obtained, a highly accurate position display, navigation and the like can be achieved.

DESCRIPTION OF NUMERALS

1: Positioning Device; 10: Antenna; 11: RF Processor; 12: Baseband Converter; 13: Carrier Correlation Unit; 31: Carrier Correlator; 32: Loop Filter; 33: Carrier NCO; 14: Code Correlation Unit; 41P: P Correlator; 41E: E Correlator; 41L: L Correlator; 42: Adder; 43: Loop Filter; 44: Code NCO; 45: Shift Register; 15: Delta Range Measurer; 16: CNo Measurer; 17: Pseudorange Calculator; 18: Positioning Operator: 100: Mobile Terminal; 110: Receiver; 120: Application Processor; and 200: GNSS Receiving Apparatus.

What is claimed is:

1. A method of positioning by calculating a position or a speed of a GNSS receiving apparatus by using a track filter based on reception signals of GNSS positioning signals, comprising:
    detecting multipath based on a position accuracy degradation serving as an index of a positioning accuracy based on locations of GNSS satellites and a C/No;
    setting an error covariance matrix of observed errors serving as a parameter of designing the track filter, based on whether the multipath is detected; and
    calculating the position or the speed by using the track filter set in the setting the error covariance matrix.

2. The positioning method of claim 1, further comprising:
    calculating an observed pseudorange to a GNSS receiving apparatus based on a code phase difference of reception signals received at a first time point; and
    calculating an estimated pseudorange based on a position of a satellite at the first time point and a position of the GNSS receiving apparatus at the first time point that is calculated based on a position and a speed of the GNSS receiving apparatus at a second time point that is before the first time point,
    wherein the detecting the multipath further includes detecting multipath based on the observed pseudorange and the estimated pseudorange.

3. The positioning method of claim 2, further comprising
    setting a threshold based on the position accuracy degradation, wherein the detecting the multipath includes detecting multipath based on a result of comparing a difference value between the observed pseudorange and the estimated pseudorange with the threshold.

4. The positioning method of claim 3, wherein the setting the covariance matrix includes setting, when the multipath is detected in the detecting the multipath, an error variance of the error covariance matrix based on the threshold, and
    wherein the setting the covariance matrix includes setting, when the multipath is not detected in the detecting the multipath, the error variance based on the C/No.

5. The positioning method of claim 4, wherein the error variance when the multipath is detected is the threshold, and the error variance when the multipath is not detected is a value calculated by using an approximate equation of an index function with the C/No that is obtained empirically in advance.

6. The positioning method of claim 3, wherein the setting the threshold includes multiplying the threshold by a predetermined correction coefficient.

7. The positioning method of claim 6, wherein the correction coefficient for a pseudorange is different from the correction coefficient for a relative speed.

8. The positioning method of claim 6, wherein the correction coefficient is different depending on whether a $\chi^2$ test is adopted in which an observed value is used as the observed pseudorange and an expected value is used as the estimated pseudorange.

9. A GNSS receiving apparatus for performing a positioning based on reception signals of GNSS positioning signals, comprising:
    a multipath detector configured to detect multipath based on a position accuracy degradation serving as an index of a positioning accuracy based on locations of GNSS satellites and a C/No;
    an observed error setter configured to set an error covariance matrix of observed errors serving as a parameter of designing the track filter, based on whether the multipath is detected; and
    a positioning operator configured to calculate the position or the speed by using the track filter set in the observed error setter.

10. The GNSS receiving apparatus of claim 9, further comprising:
    an observed pseudorange calculator configured to calculate an observed pseudorange to a GNSS receiving apparatus based on a code phase difference of reception signals received at a first time point; and an estimated pseudorange calculator configured to calculate an estimated pseudorange based on a position of a satellite at the first time point and a position of the GNSS receiving apparatus at the first time point that is calculated based on a position and a speed of the GNSS receiving apparatus at a second time point that is before the first time point, wherein the multipath detector is further configured to detect the multipath based on the observed pseudorange and the estimated pseudorange.

11. The GNSS receiving apparatus of claim 10, further comprising
a threshold setter for setting a threshold based on the position accuracy degradation, wherein the multipath detector is configured to detect the multipath based on a result of comparing a difference value between the observed pseudorange and the estimated pseudorange with the threshold.

12. The GNSS receiving apparatus of claim 11, wherein, when the multipath is detected by the multipath detector, the observed error setter sets an error variance of the error covariance matrix based on the threshold, and
wherein, when the multipath is not detected by the multipath detector, the observed error setter sets the error variance based on the C/No.

13. A mobile terminal, comprising:
the GNSS receiving apparatus of claim 9; and
an application processor configured to execute a predetermined application by using a positioning operation result from the positioning operator.

* * * * *